United States Patent [19]

Via

[11] 4,077,860
[45] Mar. 7, 1978

[54] PHOTOPOLYMERIZABLE COMPOSITION STABILIZED WITH AMMONIUM SALTS OF PHOSPHORUS ACID AND PROCESS

[75] Inventor: Francis A. Via, Yorktown Heights, N.Y.

[73] Assignee: Stauffer Chemical Company, Westport, Conn.

[21] Appl. No.: 755,286

[22] Filed: Dec. 29, 1976

[51] Int. Cl.² .............................. C08F 2/50; C08F 4/00
[52] U.S. Cl. .......................... 204/159.24; 204/159.23; 260/502.4 R
[58] Field of Search ..................... 204/159.23, 159.24; 260/45.9 NP, 502.4 R, 590 D

[56] References Cited

U.S. PATENT DOCUMENTS

| | | | |
|---|---|---|---|
| 2,448,828 | 9/1948 | Renfrew | 204/159.23 X |
| 2,647,080 | 7/1953 | Joyce | 204/159.23 X |
| 3,814,702 | 6/1974 | Bourdon et al. | 204/159.23 X |
| 3,819,495 | 6/1974 | Roskott et al. | 204/159.19 |

FOREIGN PATENT DOCUMENTS

| | | |
|---|---|---|
| 2,140,958 | 2/1972 | Germany. |
| 2,220,507 | 12/1972 | Germany. |
| 2,263,804 | 7/1973 | Germany. |
| 73-75638 | 10/1973 | Japan. |
| 1,199,015 | 7/1970 | United Kingdom. |

Primary Examiner—Walter C. Danison
Attorney, Agent, or Firm—Ellen P. Trevors

[57] ABSTRACT

A stabilized photopolymerizable composition comprising photopolymerizable ethylenically unsaturated monomeric compounds, a photoinitiator and at least one organic ammonium salt of phosphorus acid as a stabilizer.

52 Claims, No Drawings

PHOTOPOLYMERIZABLE COMPOSITION STABILIZED WITH AMMONIUM SALTS OF PHOSPHORUS ACID AND PROCESS

BACKGROUND OF THE INVENTION

This invention relates to stabilized photopolymerizable compositions based on photopolymerizable ethylenically unsaturated compounds containing benzoin ether initiators. More particularly, this invention relates to the use of organic ammonium salts of phosphorus acids as stabilizers for photopolymerizable compositions containing photoinitiators.

Photopolymerizable compositions containing unsaturated materials and photoinitiating compounds are well known in the art, being particularly useful for moldings and coatings. These materials polymerize at low temperatures when exposed to actinic radiation. While numerous compounds have been found useful as photoinitiators for the polymerization of unsaturated compounds, the ethers of benzoin have found wide-spread commercial acceptance. These benzoin ethers exhibit excellent cure rates, rendering them particularly attractive where rapid hardening is desirable. The use of benzoin ethers as photopolymerization initiators is described in U.S. Pat. No. 2,448,828.

While the benzoin ethers are widely used because of their excellent curing properties, they are not wholly satisfactory with regard to storage stability. Thus, unsaturated systems to which the ether is added have considerably diminished dark storage stability and will gell prematurely in many systems where storage is a key factor.

Various attempts have been made to remedy this deficiency of the benzoin compounds by including stabilizing additives in the photopolymerizable composition. For example, U.S. Pat. No. 2,647,080 discloses the addition of allyl glycidyl ether to systems containing halogen-free acrylate and acyloin ether initiators. U.S. Pat. No. 3,814,702 teaches photosensitizing compositions comprising a benzoin ether, an organic acid and a solvent; optionally, a weak reducing agent may be included in the photosensitizing composition. Other multi-component stabilizing systems are described in U.S. Pat. No. 3,819,495, which discloses a copper compound soluble in polyester resin and an organic compound having ionically-bound chlorine or capable of forming chlorine ions in situ as stabilizers for polyester resins containing benzoin ethers, while U.S. Pat. No. 3,819,496 discloses similar systems employing an iron and/or manganese compound instead of the copper compound.

Other compounds have been added to benzoin ether systems as cure accelerators. For example, Japan Kokai No. 73 00,983 discloses the use of dialkylaminobenzoins in conjunction with benzoin methyl ether as curing agents for polyester resins, while Japan Kokai No. 73 75,638 teaches mixtures of benzoin alkyl ether and p,p'-bis (dialkylamino) thiobenzophenone as curing agents that provide colored products. In German Offen. No. 2,263,804, the addition of ascorbic acid or thiourea to benzoin ethyl ether to reduce the exposure time of photopolymer printing reliefs is disclosed. While functioning to accelerate curing, many of these compounds are known to decrease the storage stability of the system.

Various quaternary ammonium halides and selected phosphorus compounds have also been described as having utility in the photopolymerization area. For example, German Offen. No. 2,220,507 discloses polyester-based compositions containing benzoin iso-propyl ether and benzyltrimethyl-ammonium chloride, while German Offen. No. 2,140,958 teaches a multi-component system comprising a benzoin ether, a phosphine and a phosphite as photoinitiators for various monomers. German Offen. No. 2,136,633 teaches the use of dibasic phosphorus-containing acid stabilizers such as pyrophosphoric acid in systems containing benzoin ethers. The use of oxyphosphoranes in polymerizable systems which may include benzoin ethers is described in U.S. Pat. No. 3,682,808.

Now it has been found in accordance with this invention that selected organic ammonium salts of phosphorus acids are excellent stabilizing agents for photopolymerizable compositions containing photoinitiators. These stabilizing agents function to improve the dark storage capability of the composition without significantly detracting from the cure rate.

SUMMARY OF THE INVENTION

The stabilized photopolymerizable composition of this invention comprises an ethylenically unsaturated monomeric compound, a photoinitiator and at least one organic ammonium salt of phosphorus acid.

DETAILED DESCRIPTION OF THE INVENTION

More in detail, the photopolymerizable composition of this invention comprises at least one photopolymerizable ethylenically unsaturated compound containing a photoinitiator in an amount sufficient to initiate photopolymerization and a stablizing amount of an ammonium salt of a phosphorus acid having the formula

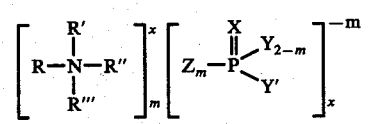

wherein
R is hydrocarbyl or thiophenealkylene;
R',R" and R''' are
 a. independently selected hydrocarbyl, or
 b. together are part of a heterocyclic amino radical in which the quaternary nitrogen in the formula is part of the ring;
X is oxygen or sulfur;
Y and Y' are independently selected alkoxy, thioalkoxy, alkenyloxy, thioalkenyloxy, alkyl, carboalkoxyalkyl, phenylalkyl, phenyl, thiophenoxy, aryloxy, alkaryloxy, aralkoxy or alkylthiophenoxy;
Z is oxygen or sulfur; and
m is 1 or 2.

Formula I also includes compounds where the ammonium ions are attached to the phosphorus anion via an alkylene or arylene group. This forms a zwitterion wherein the ions are connected, generally by a carbon or carbon and oxygen chain, as for example:

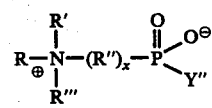

wherein R, R' and R'" are as above and R" can be any divalent connecting unit such as CH₂, and x can vary from 1 to 10. Representative of the above is:

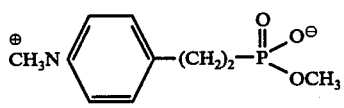

In the aforementioned definitions, the term "hydrocarbyl" refers to acyclic hydrocarbon groups which may have straight or branched chains and may contain unsaturated carbon-to-carbon bonds. Typical are alkyl, aryl, aralkyl and alkenyl groups having 1 to 30 carbon atoms. The term "aryl," where unmodified, indicates an aromatic hydrocarbon of 6 to 13 carbon atoms while "aralkyl" refers to a 6 carbon aromatic hydrocarbon containing a straight chain saturated hydrocarbon substituent of from 1 to 3 carbon atoms. The groups represented by Y and Y' contain from 1 to 30 carbon atoms. Where R',R" and R'" are part of a heterocyclic amino radical, they can form a piperidinium, morpholinium, pyridinium, N-lower alkyl pyridinium, N-lower alkyl benzoltriazolium, etc. By the term "lower alkyl" in the claims and specification herein is meant alkyl of 1 to 4 carbon atoms.

The following is a listing of typical ions constituting compounds I tabulated according to the respective ammonium ions and phosphorus ester anions.

| AMMONIUM IONS | PHOSPHORUS ESTER ANIONS |
|---|---|
| Dodecyl trimethyl ammonium | Diphenyl phosphate |
| Hexadecyl trimethyl ammonium | Phenyl phosphate (bis-amine salt) |
| Octadecyl trimethyl ammonium | Dimethyl phosphate |
| Tridecyl trimethyl ammonium | Methyl phosphate (bis-amine salt) |
| Decyl trimethyl ammonium | Methyl methylphosphonate |
| Didodecyl dimethl ammonium | Methylphosphonate (bis-amine salt) |
| Dimethyl propyl dodecyl ammonium | Diethyl phosphate |
| Dioctyl dimethyl ammonium | Ethyl phosphate (bis-amine salt) |
| Dodecylbenzyl trimethyl ammonium | Dioctyl phosphate |
| Dodecyl dimethyl butyl ammonium | Dibenzyl phosphate |
| Benzyl trimethyl ammonium | Diallyl phosphate |
| | Methyl phenyl phosphate |
| | Bis (octylphenyl) phosphate |
| | Di-n-dodecyl phosphate |
| Allyl tributyl ammonium | Diethyl dithiophosphate |
| Trimethyl hexadecenyl ammonium (Unsaturated R Group) | Di-n-butyl-dithiophosphate |
| Heptadecyl trimethyl ammonium | Dibenzyl dithiophosphate |
| Trioctyl methyl-ammonium | Diphenyl dithiophosphate |
| Nonyl trimethyl ammonium | Bis(nonyl phenyl) phosphate |
| Tris(n-tridecyl) methyl ammonium | Dibutyl phosphate |
| Tris(n-dodecyl) methyl ammonium | Methyl octylphosphonate |
| Tris(isooctyl) methyl ammonium | Hexadecyl phosphonate |
| Dimethyl butyl hexadecyl ammonium | Methyl hexadecyl phosphonate |
| Triethyl methyl ammonium | Methyl tertiary-butyl phosphonate |
| 2-ethylhexyl dimethyl dodecyl ammonium | Methyl carbomethoxymethyl phosphonate |
| Dimethyl ethyl dodecyl ammonium | |
| Dimethyl butyl dodecyl ammonium | |
| Trimethyl dodecyl ammonium | |
| Hexadecyl dimethyl ethyl ammonium | |
| Tris(dodecyl) butyl ammonium | |
| Tetramethyl ammonium | |
| Trimethyl benzyl ammonium | |
| 4-acetyl N-methyl pyridinium | |

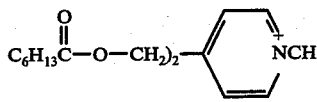

1-(N,N-dimethyl)-1-imidazolium
1-(N,N-dimethyl)-1-pyrrazolium
N-methyl oxazolium
N-butyl quinolinium
N-methyl pyrrolium
N,N-diethyl pyrrolidinium
N-methyl, N-hexyl piperidinium
N-methyl, N-butyl piperidinium
N-isopropyl thiazolium
N-ethyl, N-methyl phenothiazinium
N-methyl pyridinium Members of the ammonium ions can be combined with members of the phosphorus ester anions to generate typical compounds which can be used in this invention. Thus, illustrative ammonium salts of phosphorus acids I are:

Hexadecyl trimethyl ammonium diphenyl phosphate
Decyl trimethyl ammonium diphenyl phosphate
Didodecyl dimethyl ammonium diphenyl phosphate
Dimethyl propyl dodecyl ammonium diphenyl phosphate
Dodecylbenzyl trimethyl ammonium diphenyl phosphate
Allyl tributyl ammonium diphenyl phosphate
Trimethyl hexadecenyl ammonium diphenyl phosphate
Bis (dodecyl trimethyl ammonium) phenyl phosphate Bis (octadecyl trimethyl ammonium) phenyl phosphate
Decyl trimethyl ammonium dimethyl phosphate
Didodecyl dimethyl ammonium methyl methylphosphonate
Bis (didodecyl dimethyl ammonium) methyl phosphonate
Dodecyl trimethyl ammonium dimethyl phosphate
Dodecyl trimethyl ammonium dibenzyl phosphate
Dodecyl trimethyl ammonium methyl phenyl phosphate
Dodecyl trimethyl ammonium bis (nonylphenyl) phosphate
Dodecyl trimethyl ammonium diphenyl dithiophosphate
Octadecyl trimethyl ammonium diphenyl dithiophosphate
Dodecyl trimethyl ammonium diethyl dithiophosphate
Dodecyl trimethyl ammonium diallyl phosphate
Dodecyl trimethyl ammonium diphenyl phosphate
Didodecyl dimethyl ammonium di-n-dodecyl phosphate
Dodecyl trimethyl ammonium di-n-dodecyl phosphate
Benzyl trimethyl ammonium methyl phenyl phosphate
Trimethyl hexadecenyl ammonium methyl phenyl phosphate
Octadecyl trimethyl ammonium diphenyl phosphate
Tridecyl trimethyl ammonium diphenyl phosphate
Heptadecyl trimethyl ammonium diphenyl phosphate
Benzyl trimethyl ammonium dibenzyl dithiophosphate
Hexadecyl trimethyl ammonium dimethyl phosphate
Trioctyl methyl ammonium diphenyl phosphate
Heptadecyl trimethyl ammonium dimethyl phosphate
Tris (n-tridecyl) methyl ammonium diphenyl phosphate
Tris (n-dodecyl) methyl ammonium diphenyl phosphate
Dimethyl butyl hexadecyl ammonium dibutyl phosphate
Triethyl methyl ammonium methyl methylphosphonate
N-methyl, N-butyl piperidinium dibutyl phosphate
2-ethylhexyl dimethyl dodecyl ammonium diphenyl phosphate
Dimethyl ethyl dodecyl ammonium diethyl phosphate
Dimethyl butyl dodecyl ammonium dibutyl phosphate
Trimethyl dodecyl ammonium methyl methylphosphonate
Hexadecyl dimethyl ethyl ammonium diethyl phosphate
Tris (dodecyl) butyl ammonium dibutyl phosphate
Tris (isoctyl) methyl ammonium diphenyl phosphate
Tetramethyl ammonium methyl octylphosphonate
Trimethyl benzyl ammonium methyl octylphosphonate
Tetramethyl ammonium methyl hexadecylphosphonate
Benzyl trimethyl ammonium methyl hexadecylphosphonate
Tetramethyl ammonium methyl tertiary-butyl-phosphonate
Benzyl trimethyl ammonium methyl tertiary-butyl-phosphonate
Tetramethyl ammonium methyl carbomethoxymethyl-phosphonate
Benzyl trimethyl ammonium methyl carbomethoxymethylphosphonate
Trimethyl tertiary-octylphenyl ammonium diphenyl phosphate
Trimethyl tertiary-octylphenyl ammonium methyl methylphosphonate
Tetramethyl ammonium bis(nonylphenyl) phosphate
Trimethyl tertiary-octylphenyl ammonium bis(nonylphenyl) phosphate
Benzyltrimethyl ammonium bis(nonylphenyl) phosphate

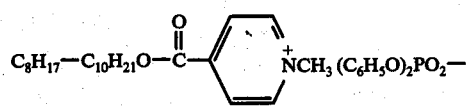

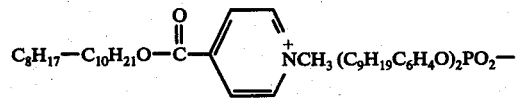

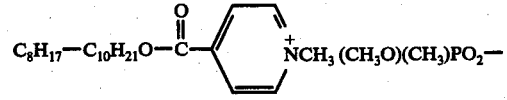

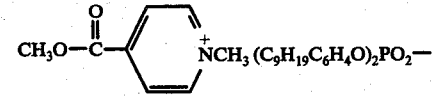

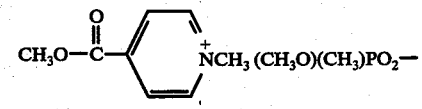

The quaternary ammonium salts of diesters of phosphoric acid which contain no N-H bonds can be prepared by known means as outlined in British Pat. Specification No. 1,199,015 (1970) and in the preprints of the Symposium on Deposit, Wear, and Emission Control by Lubricants and Fuel Additives presented in the Division of Petroleum Chemistry of the American Chemical Society, N.Y. City Meeting, Sept. 7!4 12, 1969, page A-110. These methods include:

1. Reaction of an amine with a triester of phosphoric acid in which the triester alkylates the amine. These reactions usually take place above 40°-60° and can be run neat or in alcohol solvents. All volatile species are then removed by distillation to leave behind the phosphoric acid diester salt of a quaternary ammonium cation.

where R, $R^1$ and $R^2$ can be the same or different and wherein R and $R^1$ can be conjoint and can contain one or more heterocyclic atoms, such as oxygen, nitrogen, and mixtures thereof; and represent alkyl, aralkyl, and alkenyl groups. $R^3$ is preferably of the benzyl, allyl or lower alkyl (especialy methyl) type, $R^4$ can be alkyl, aryl, alkaryl, alkoxy, aryloxy, alkaryloxy, alkyloxy, and also substituted alkyl, such as carboalkoxy, carboalkoxyalkyl, carboalkoxyaryl and the like.

These reactions are well known in the art. Reactions of primary aromatic amines are discussed in Thomas et al, Journal of the American Chemical Society, Volume 68, at page 895 (1946). Reactions of secondary and tertiary amines are discussed in Clark et al, Journal of the Chemical Society, page 2023 (1950); Atherton et al, ibid, page 1106, (1948) and Baddiley et al, ibid, page 815

(1949). Reactions of mixed aryl alkyl phosphate esters with pyridine are discussed in Osborne, Journal of Organic Chemistry, Volume 29, page 3570 (1964); See also Kirby et al, Organic Chemistry of Phosphorus, page 209 ff., (Elsevier 1967). For reactions of phosphoric acid triesters, see Kosolapoff et al, Organic Phosphorus Compounds, Volume 6, at pages 236, 515 and 523–526 (Wiley-Interscience, 1973). For reactions and phosphonates with nucleophiles, see Hudson, Structure and Mechanism in Organophosphorus Chemistry, pg. 110 (Academic Press 1965).

2. Reaction of the phosphoric acid diester with a quaternary ammonium hydroxide to generate the salt in a neutralization reaction and then removal of the water liberated.

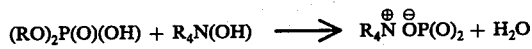

3. Reaction of the quaternary ammonium halide with the sodium or potassium salt of the phosphoric acid diester and extraction of the phosphate with a solvent such as acetone to enable removal of the sodium or potassium chloride.

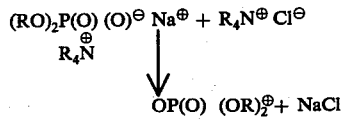

The stabilizer is generally employed in an amount from about 0.01 to about 20% by weight of the initiator and preferably from about 0.5 to about 5.0% by weight of the initiator. The initiator is generally employed in an amount from about 0.01 to about 30%, and preferably from about 1 to about 5% loading by weight of the total composition.

Photopolymerizable ethylenically unsaturated compounds useful in the compositions of this invention includde acrylic, $\alpha$-alkacrylic and $\alpha$-chloroacrylic acid compounds such as esters, amides and nitriles. Examples of such compounds are acrylonitrile, methacrylonitrile, methyl acrylate, ethyl acrylate, methyl methacrylate, isobutyl methacrylate, 2-ethyl-hexyl acrylate, methacrylamide and methyl $\alpha$-chloroacrylate. Also useful, although not preferred, are vinyl and vinylidene esters, ethers and ketones. Additionally, compounds having more than one terminal unsaturation can be used. Examples of these include diallyl phthalate, diallyl maleate, diallyl fumarate, triallyl cyanurate, triallyl phosphate, ethylene glycol dimethacrylate, glycerol trimethacrylate, pentaerythritol triacrylate, pentaerythritol tetraacrylate, trimethylolpropane triacrylate, methacrylic anhydride and allyl ethers of monohydroxy or polyhydroxy compounds such as ethylene glycol diallyl ether, pentaerythritol tetraallyl ether, and the like. Nonterminally unsaturated compounds such as diethyl fumarate can similarly be used.

The derivatives of acrylic acid, which include the derivaties of methacrylic acid, are particularly well suited to the practice of the invention and are consequently preferred components are monomers in monomer-containing polymerizable systems and as reactive enters in polymerizable polymers.

The photoinitiators suitable for use in the practice of this invention include various carbonyl compounds including the acetophenones, benzophenones, benzophenoneamine systems, etc; the acyloins; etc. Preferred are the benzoin ether initiators of the formula

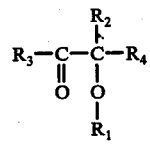

wherein $R_1$ and $R_2$ are, independently from one another, selected from hydrogen atoms, or aliphatic or aromatic hydrocarbon radicals, and $R_3$ and $R_4$ are, independently from one another, benzene nuclei, or benzene nuclei monodi- or tri-substituted with alkyl, alkoxy, trihaloalkyl, metahydroxy, alkyenedioxy groups or halogen atoms.

The benzoin ethers are known photosensitizers that may be prepared according to the method described by Whitmore in Organic Chemistry, pages 405, by Fisher in Berichte, 26,2412 (1893), or by Irvine and Moodie as described in Journal Chemical Society, 91,543,(1907).

Among the various benzoin ethers suitable for the purposes of the invention are in particular the phenyl, cresyl, benzyl, cyclohexyl ethers thereof and alkyl ethers thereof such as the methyl, ethyl, propyl, isopropyl, butyl and isobutyl ether, and isomers thereof.

While any of the ammonium salts of a phosphorus acid having the formula I can be used in the practice of this invention, preferred are those compounds I where R is alkyl, aryl, aralkyl or thiophenealkylene; R', R" and R'" are independently selected alkyl or together are part of a heterocyclic amino radical of from 5 to 9 carbon atoms; and Y and Y' are alkoxy or phenoxy. Particularly preferred are those compounds I where:

a. R, R', R" and R'" are independently selected alkyl of 1 to 20 carbon atoms and Y and Y' are phenoxy, alkoxy or carboalkoxyalkyl of 1 to 10 carbon atoms; or b. R is lower alkyl; R', R" and R'" are part of a heterocyclic amino radical of from 5 to 9 carbon atoms and Y and Y' are phenoxy; or c. R is thiophenealkylene where the alkylene has 1 to 4 carbon atoms or aralkyl of 7 to 10 carbon atoms; and R', R", R'", Y and Y" are lower alkyl.

The photopolymerizable compositions of this invention have been found to have markedly enhanced dark-storage capability over corresponding systems not including the ammonium salt of a phosphorus acid I. Curing occurs upon exposure of the compositions to actinic radiation, that is, radiation in the region of about 2000 Angstroms to about 8000 Angstroms and preferably between about 2400 Angstroms and 5400 Angstroms.

The following examples will serve to illustrate the practice of this invention.

EXAMPLES 1 – 19

Various ammonium phosphate and phosphite stabilizers were added to Satomer SR 351 resin containing 3.6% by weight of benzoin isobutyl ether. Satomer SR 351 resin is trimethylolpropane triacrylate marketed by Satomer Company. The amount of stabilizer added was 1.0% by weight of the benzoin isobutyl ether. The stabilized compositions were stored in the dark at 65° C. Stability is reported in Table 1 hereafter as the number of days the compositions remained stable prior to gelation.

TABLE 1

| EX. | STABILIZER | STABILITY (DAYS at 65° C.) |
|---|---|---|
| CONTROL | — | 4 |
| 1 | $(C_{12}H_{25})_3\overset{+}{N}CH_3{}^-OP(OC_6H_5)_2$ (with C=O) | 14 |
| 2 | (piperidine)N—CH$_3{}^-$OP(OC$_6$H$_5$)$_2$ (with C=O) | 11 |
| 3 | $CH_3\overset{+}{N}$(piperazine)$\overset{+}{N}CH_3$ [$^-$OP(OC$_6$H$_5$)$_2$]$_2$ (with C=O) | 8 |
| 4 | $C_{16}H_{33}\overset{+}{N}(CH_3)_3{}^-OP(OC_6H_5)_2$ | 14 |
| 5 | $C_{12}H_{25}N^+(CH_3)_3{}^-OP(OC_6H_5)_2$ | 30 |
| 6 | $(i\text{-}C_8H_{17})_3\overset{+}{N}CH_3{}^-OP(OC_6H_5)_2$ | 16 |
| 7 | $C_6H_5CH_2\overset{+}{N}(CH_3)_3{}^-OP(OC_6H_5)_2$ | 11 |
| 8 | benzimidazolinium structure with $^-$OP(OC$_6$H$_5$)$_2$ | 6 |
| 9 | $C_{12}H_{25}\overset{+}{N}(CH_3)_3{}^-OP(OC_4H_9)_2$ | 2 |
| 10 | $C_{12}H_{25}\overset{+}{N}(CH_3)_3{}^-OP(OC_4H_9)_2$ | 2 |
| 11 | $CH_3\overset{+}{N}(C_2H_5)_3{}^-OPOCH_3$ with OCH$_2$CH$_2$COOCH$_3$ | 1 |
| 12 | $CH_3\overset{+}{N}(C_2H_5)_3{}^-OP(OCH_3)_2$ | 1 |
| 13 | $C_6H_5\overset{+}{N}(CH_3)_3{}^-OP(OCH_3)_2$ | 7 |
| 14 | (thiophene)CH$_2\overset{+}{N}(CH_3)_3{}^-OP(OCH_3)_2$ | 8 |
| 15 | $C_6H_5CH_2\overset{+}{N}(CH_3)_3{}^-OP$ cyclic (S=, O—C—O) | 2 |
| 16 | $(C_{18}H_{37})_2\overset{+}{N}$—CH$_2$POCH$_3$, CH$_3$, O— cyclic | 7 |
| 17 | $C_{16}H_{33}\overset{+}{N}(CH_3)_2{}^-OP(OC_4H_9)_2$, C$_4$H$_9$ | 2 |
| 18 | *Primene 81R(HO)$_{1,2}$P(OiC$_8$H$_{17}$)$_{1,2}$ | 2 |
| 19 | **C$_{12}$H$_{25}$N(CH$_3$)$_2$ + (HO)$_{1,2}$P(OC$_{10}$H$_{21}$)$_{1,2}$ | 1 |

*Primene 81R, available from Armour Chemical Company, is a C$_{12}$ primary amine.
**This formula represents a mixture obtained by reacting the tertiary amine with a mixed mono- and dialkyl phosphate.

EXAMPLES 20–38

In order to demonstrate the efficacy of the stabilizers of this invention in another system, the stabilizers were added to Union Carbide Chemical Company's PEA-HF, a high functionality pentaerythritol acrylate monomer, to which had been added 1.2% by weight of benzoin isobutyl ether. The amount of stabilizer added was 1.0% by weight of the benzoin isobutyl ether. Stability was determined as described in Examples 1–19 and is reported in Table 2 hereafter. These examples demonstrate that the efficacy of the stabilizer of this invention varies with the particular polymerizable component to which it is added.

TABLE 2

| EX. | STABILIZER | STABILITY (DAYS at 65° C.) |
|---|---|---|
| CONTROL | — | 1 |
| 20 | $(C_{12}H_{25})_3\overset{+}{N}CH_3{}^-OP(OC_6H_5)_2$ | 7 |
| 21 | (piperidine)N—CH$_3{}^-$OP(OC$_6$H$_5$)$_2$ | 12 |
| 22 | $CH_3\overset{+}{N}$(piperazine)$\overset{+}{N}CH_3$ [$^-$OP(OC$_6$H$_5$)$_2$]$_2$ | 4 |
| 23 | $C_{16}H_{33}\overset{+}{N}(CH_3)_3{}^-OP(OC_6H_5)_2$ | 2 |
| 24 | $C_{12}H_{25}N^+(CH_3)_3{}^-OP(OC_6H_5)_2$ | 2 |
| 25 | $(i\text{-}C_8H_{17})_3\overset{+}{N}CH_3{}^-OP(OC_6H_5)_2$ | 2 |
| 26 | $C_6H_5CH_2\overset{+}{N}(CH_3)_3{}^-OP(OC_6H_5)_2$ | 1 |
| 27 | benzimidazolinium structure with $^-$OP(OC$_6$H$_5$)$_2$ | 2 |
| 28 | $C_{12}H_{25}\overset{+}{N}(CH_3)_3{}^-OP(OC_4H_9)_2$ | 2 |
| 29 | $C_{12}H_{25}\overset{+}{N}(CH_3)_3{}^-OP(OC_4H_9)_2$ | 2 |
| 30 | | 10 |
| 31 | $CH_3\overset{+}{N}(C_2H_5)_3{}^-OPOCH_3$, OCH$_2$CH$_2$COOCH$_3$ | 6 |
| 32 | $CH_3\overset{+}{N}(C_2H_5)_3{}^-OP(OCH_3)_2$ | 3 |
| 33 | $C_6H_5\overset{+}{N}(CH_3)_3{}^-OP(OCH_3)_2$ | 2 |
| 34 | (cyclopentene)CH$_2\overset{+}{N}(CH_3)_3{}^-OP(OCH_3)_2$ | 2 |
| 35 | $C_6H_5CH_2\overset{+}{N}(CH_3)_3{}^-OP$ cyclic (S=, O—C—O) | 2 |
| 36 | $(C_{18}H_{37})_2\overset{+}{N}$—CH$_2$POCH$_3$, CH$_3$, O— | 2 |
| 37 | $C_{16}H_{33}\overset{+}{N}(CH_3)_2{}^-OP(OC_4H_9)_2$, C$_4$H$_9$ | 2 |
| | *Primene 81R(HO)$_{1,2}$P(OiC$_8$H$_{17}$)$_{1,2}$ | |

TABLE 2-continued

| EX. | STABILIZER | STABILITY (DAYS at 65° C.) |
|---|---|---|
| 38 | **$C_{12}H_{25}N(CH_3)_2$ + $(HO)_{1,2}\overset{O}{\underset{\parallel}{P}}(OC_{10}H_{21})_{1,2}$ | 2 |

*Primene 81R, available from Armour Chemical Company, is a $C_{12}$ primary amine.
**This formula represents a mixture obtained by reacting the tertiary amine with a mixed mono- and dialkyl phosphate.

EXAMPLE 29

In order to demonstrate the efficacy of the stabilizers of this invention with other initiators, a control formulation was prepared consisting of trimethyolpropane triacrylate containing 3.7% by weight of benzophenone and 3.7% by weight of dimethylethanolamine. To a similar formulation was added dodecyltrimethylammonium diphenylphosphate at a loading of 2% by weight of the benzophenone. Both formulations were stored in the absence of light at 65° C. The control formulations gelled in 1 day and the stabilized formulation gelled in 2 days.

What is claimed is:

1. A process for preparing a photopolymerizable composition comprising forming a mixture containing a photopolymerizable ethylenically unsaturated compound, a benzoin ether in an amount sufficient to initiate photopolymerization and a stabilizing amount of an ammonium salt of a phosphorus acid having the formula

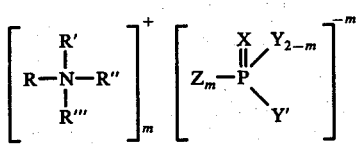

wherein
R is hydrocarbyl or thiophenealkylene;
R', R" and R''' are
 a. independently selected hydrocarbyl; or
 b. together are part of a heterocyclic amino radical in which the quaternary nitrogen in the formula is part of the ring;
X is oxygen or sulfur;
Y and Y' are independently selected alkoxy, thioalkoxy, alkenyloxy, thioalkenyloxy, alkyl, carboalkoxyalkyl, phenylalkyl, phenyl, thiophenoxy, aryloxy, alkaryloxy, aralkoxy, or alkylthiophenoxy;
Z is oxygen or sulfur; and
m is 1 or 2.

2. The process of claim 1 wherein, in said formula, R is alkyl, aryl, aralkyl, or thiophenealkylene; R', R" and R''' are independently selected alkyl or together are part of a heterocyclic amino radical of from 5 to 9 carbon atoms; and Y and Y' are alkoxy or phenoxy.

3. The process of claim 2 wherein said benzoin ether is present in said composition at a concentration of about 0.01 to about 30 percent by weight, and said ammonium salt of a phosphorus acid is present at a concentration of about 0.01 to about 20 percent by weight of said benzoin ether.

4. The process of claim 3 wherein R,R', R" and R''' in said formula are independently selected alkyl of 1 to 20 carbon atoms and Y and Y' are phenoxy.

5. The process of claim 4 wherein said ammonium salt of a phosphorus acid is tridodecyl methyl ammonium diphenyl phosphate.

6. The process of claim 4 wherein said ammonium salt of a phosphorus acid is hexadecyl trimethyl ammonium diphenyl phosphate.

7. The process of claim 4 wherein said ammonium salt of a phosphorus acid is dodecyl trimethyl ammonium diphenyl phosphate.

8. The process of claim 4 wherein said ammonium salt of a phosphorus acid is tri iso-octyl methyl ammonium diphenyl phosphate.

9. The process of claim 3 wherein R is lower alkyl; R', R" and R''' are part of a heterocyclic amino radical of from 5 to 9 carbon atoms; and Y and Y' are phenoxy.

10. The process of claim 9 wherein said ammonium salt of a phosphorus acid is N-methyl pyridinium diphenyl phosphate.

11. The process of claim 9 wherein said ammonium salt of a phosphorus acid is N-methyl benzoltriazolium diphenyl phosphate.

12. The process of claim 9 wherein said ammonium salt of a phosphorus acid has the formula

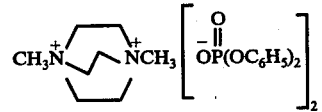

13. The process of claim 3 wherein R,R',R" and R''' are alkyl of 1 to 16 carbon atoms, and Y and Y' are alkoxy or carboalkoxyalkyl of 1 to 10 carbon atoms.

14. The process of claim 13 wherein said ammonium salt of a phosphorus acid is dodecyl trimethyl ammonium dibutyl phosphate.

15. The process of claim 13 wherein said ammonium salt of a phosphorus acid is dodecyl trimethyl ammonium dibutyl phosphonate.

16. The process of claim 13 wherein said ammonium salt of a phosphorus acid is methyl methoxycarbonylethyl phosphate.

17. The process of claim 13 wherein said ammonium salt of a phosphorus acid is methyl triethyl ammonium dimethyl phosphate.

18. The process of claim 13 wherein said ammonium salt of a phosphorus acid is hexadecyl butyl dimethyl ammonium dibutyl phosphate.

19. The process of claim 13 wherein said ammonium salt of a phosphorus acid has the formula

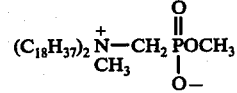

20. The process of claim 13 wherein R is a $C_{12}$ group, R', R" and R''' are methyl and Y and Y' are octyl.

21. The process of claim 13 wherein R is dodecyl, R', R" and R''' are methyl, Y and Y' are decyl and m is a mixture of 1 and 2.

22. The process of claim 3 wherein R is thiophenealkylene where the alkylene has 1 to 4 carbon atoms or aralkyl of 7 to 11 carbon atoms; R', R", R''', Y and Y'' are lower alkyl.

23. The process of claim 22 wherein said ammonium salt of a phosphorus acid is benzyl trimethyl ammonium dimethyl phosphate.

24. The process of claim 22 wherein said ammonium salt of a phosphorus acid is thiophenemethylene trimethyl ammonium dimethyl phosphate.

25. The process of claim 3 wherein the ethylenically unsaturated compounds consist essentially of derivatives of acrylic acid.

26. In a process for preparing a photopolymerizable composition comprising at least one photopolymerizable ethylenically unsaturated compound and a photoinitiating compound, the improvement which comprises incorporating a stabilizing amount of an ammonium salt of a phosphorus acid having the formula

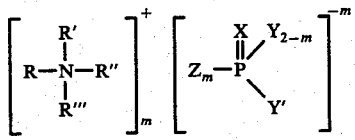

wherein
R is hydrocarbyl or thiophenealkylene;
R', R" and R'" are
 a. independently selected hydrocarbyl; or
 b. together are part of a heterocyclic amino radical in which the quaternary nitrogen in the formula is part of the ring;
X is oxygen or sulfur;
Y and Y' are independently selected alkoxy, thioalkoxy, alkenyloxy, thioalkenyloxy, alkyl, carboalkoxyalkyl, phenylalkyl, phenyl, thiophenoxy, aryloxy, alkaryloxy, aralkoxy, or alkylthiophenoxy;
Z is oxygen or sulfur; and
m is 1 or 2.

27. A photopolymerizable composition comprising at least one photopolymerizable ethylenically unsaturated compound containing a benzoin ether in an amount sufficient to initiate photopolymerization and a stabilizing amount of an ammonium salt of a phosphorus acid having the formula

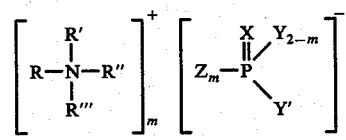

wherein
R is hydrocarbyl or thiophenealkylene;
R', R" and R'" are
 a. independently selected hydrocarbyl; or
 b. together are part of a heterocyclic amino radical in which the quaternary nitrogen in the formula is part of the ring;
X is oxygen or sulfur;
Y and Y' are independently selected alkoxy, thioalkoxy, alkenyloxy, thioalkenyloxy, alkyl, alkylcarboxyalkyl, phenylalkyl, phenyl, thiophenoxy, aryloxy, alkaryloxy, aralkoxy, or alkylthiophenoxy;
Z is oxygen or sulfur; and
m is 1 or 2.

28. The composition of claim 27, wherein, in said formula, R is alkyl, aryl, aralkyl, or thiophenealkylene R', R" and R'" are independently selected alkyl or together are part of a heterocyclic amino radical of from 5 to 9 carbon atoms; and Y and Y' are alkoxy or phenoxy.

29. The composition of claim 28 wherein said benzoin ether is present in said composition at a concentration of about 0.01 to about 30 percent by weight, and said ammonium salt of a phosphorus acid is present at a concentration of about 0.01 to about 20 percent by weight of said benzoin ether.

30. The composition of claim 29 wherein R,R', R" and R'" in said formula are independently selected alkyl of 1 to 20 carbon atoms and Y and Y' are phenoxy.

31. The composition of claim 30 wherein said ammonium salt of a phosphorus acid is tridodecyl methyl ammonium diphenyl phosphate.

32. The composition of claim 30 wherein said ammonium salt of a phosphorus acid is hexadecyl trimethyl ammonium diphenyl phosphate.

33. The composition of claim 30 wherein said ammonium salt of a phosphorus acid is dodecyl trimethyl ammonium diphenyl phosphate.

34. The composition of claim 30 wherein said ammonium salt of a phosphorus acid is tri iso-octyl methyl ammonium diphenyl phosphate.

35. The composition of claim 29 wherein R is lower alkyl; R', R" and R'" are part of a heterocyclic amino radical of from 5 to 9 carbon atoms; and Y and Y' are phenoxy.

36. The composition of claim 35 wherein said ammonium salt of a phosphorus acid is N-methyl pyridinium diphenyl phosphate.

37. The composition of claim 35 wherein said ammonium salt of a phosphorus acid is N-methyl benzoltriazolium diphenyl phosphate.

38. The composition of claim 35 wherein said ammonium salt of a phosphorus acid has the formula

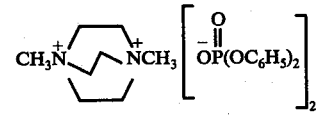

39. The composition of claim 29 wherein R,R',R" and R'" are alkyl of 1 to 16 carbon atoms; and Y and Y' are alkoxy or carboalkoxyalkyl of 1 to 10 carbon atoms.

40. The composition of claim 39 wherein said ammonium salt of a phosphorus acid is dodecyl trimethyl ammonium dibutyl phosphate.

41. The composition of claim 39 wherein said ammonium salt of a phosphorus acid is dodecyl trimethyl ammonium dibutyl phosphate.

42. The composition of claim 39 wherein said ammonium salt of a phosphorus acid is methyl methoxycarbonylethyl phosphate.

43. The composition of claim 39 wherein said ammonium salt of a phosphorus acid is methyl triethyl ammonium dimethyl phosphate.

44. The composition of claim 39 wherein said ammonium salt of a phosphorus acid is hexadecyl butyl dimethyl ammonium dibutyl phosphate.

45. The composition of claim 39 wherein said ammonium salt of a phosphorus acid has the formula

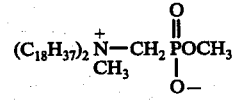

46. The composition of claim 39 wherein R is a $C_{12}$ group, R', R" and R'" are methyl and Y and Y' are octyl.

47. The composition of claim 39 wherein R is dodecyl, R',R" and R'" are methyl, Y and Y' are decyl and m is a mixture of 1 and 2.

48. The composition of claim 29 wherein R is thiophenealkylene where the alkylene has 1 to 4 carbon atoms or aralkyl of 7 to 11 carbon atoms; R', R", R'", Y and Y" are lower alkyl.

49. The composition of claim 48 wherein said ammonium salt of a phosphorus acid is benzyltrimethyl ammonium dimethyl phosphate.

50. The composition of claim 49 wherein said ammonium salt of a phosphorus acid is thiophenemethylene trimethyl ammonium dimethyl phosphate.

51. The composition of claim 29 wherein the ethylenically unsaturated compounds consist essentially of derivatives of acrylic acid.

52. A photopolymerizable composition comprising at least one photopolymerizable ethylenically unsaturated compound containing a photoinitiating compound in an amount sufficient to initiate photopolymerization and a stabilizing amount of an ammonium salt of a phosphorus acid having the formula

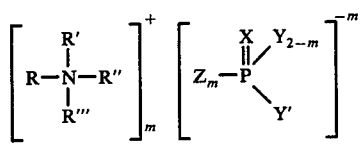

wherein
R is hydrocarbyl or thiophenealkylene;
R', R" and R'" are
 a. independently selected hydrocarbyl; or
 b. together are part of a heterocyclic amino radical in which the quaternary nitrogen in the formula is part of the ring;
X is oxygen or sulfur;
Y and Y' are independently selected alkoxy, thioalkoxy, alkenyloxy, thioalkenyloxy, alkyl, alkylcarboxyalkyl, phenylalkyl, phenyl, thiophenoxy, aryloxy, alkaryloxy, aralkoxy, or alkylthiophenoxy;
Z is oxygen or sulfur; and
m is 1 or 2.

* * * * *